United States Patent
Hsieh et al.

(10) Patent No.: US 10,599,026 B2
(45) Date of Patent: Mar. 24, 2020

(54) WAVELENGTH CONVERSION MODULE, FORMING METHOD OF WAVELENGTH CONVERSION MODULE, AND PROJECTION DEVICE

(71) Applicant: Coretronic Corporation, Hsin-Chu (TW)

(72) Inventors: Chi-Tang Hsieh, Hsin-Chu (TW); Chia-Lun Tsai, Hsin-Chu (TW); Jo-Han Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/514,984

(22) Filed: Jul. 17, 2019

(65) Prior Publication Data

US 2020/0026171 A1    Jan. 23, 2020

(30) Foreign Application Priority Data

Jul. 19, 2018   (CN) .......................... 2018 1 0795709

(51) Int. Cl.
 *G03B 21/20*   (2006.01)
 *B32B 7/12*    (2006.01)
 *B32B 37/18*   (2006.01)
 *B32B 37/12*   (2006.01)

(52) U.S. Cl.
 CPC ............. *G03B 21/204* (2013.01); *B32B 7/12* (2013.01); *B32B 37/1207* (2013.01); *B32B 37/18* (2013.01); *B32B 2307/416* (2013.01); *B32B 2307/42* (2013.01); *B32B 2307/422* (2013.01); *B32B 2551/00* (2013.01)

(58) Field of Classification Search
 CPC ......... G03B 21/204; B32B 7/12; B32B 37/18; B32B 37/1207
 See application file for complete search history.

(56) References Cited

FOREIGN PATENT DOCUMENTS

| CN | 102650814 | 2/2015 |
|---|---|---|
| CN | 104932187 | 9/2015 |
| CN | 206946178 | 1/2018 |
| TW | 201514603 | 4/2015 |

*Primary Examiner* — Joseph L Williams
(74) *Attorney, Agent, or Firm* — JCIPRNET

(57) ABSTRACT

A wavelength conversion module including a substrate and a wavelength conversion layer is provided. The substrate includes an axis, and the axis is located at the center of the substrate. The wavelength conversion layer is located on the substrate and includes two first wavelength conversion layers and a second wavelength conversion layer. Each of the first wavelength conversion layers includes a wavelength conversion material and a first bonding material. The second wavelength conversion layer is located between the two first wavelength conversion layers in a radial direction from the axis of the substrate to an edge of the substrate, and the second wavelength conversion layer includes the wavelength conversion material and a second bonding material. The first bonding material is different from the second bonding material. Moreover, a projection device and a forming method of the wavelength conversion module are also provided.

20 Claims, 12 Drawing Sheets

WAVELENGTH CONVERSION MODULE, FORMING METHOD OF WAVELENGTH CONVERSION MODULE, AND PROJECTION DEVICE

CROSS-REFERENCE TO RELATED APPLICATION

This application claims the priority benefit of China application serial no. 201810795709.3, filed on Jul. 19, 2018. The entirety of the above-mentioned patent application is hereby incorporated by reference herein and made a part of this specification.

BACKGROUND OF THE INVENTION

Field of the Invention

The invention relates to an optical module, a forming method thereof, and an optical device including the optical member above, and more particularly, to a wavelength conversion module, a forming method of the wavelength conversion module, and a projection device.

Description of Related Art

In recent years, projection devices based on solid-state light sources such as light-emitting diodes (LEDs) and laser diodes have gradually gained a place in the market. Since laser diodes have a luminous efficiency of higher than about 20%, to break the light source limit of light-emitting diodes, a technique of using a laser light source to excite phosphor to produce a pure color light source required by a projector has been developed gradually.

However, in general, the manufacture of the current phosphor wheel involves mixing a phosphor or a reflective material with silicone and then coating the mixture on the substrate of the phosphor wheel to respectively form a wavelength conversion layer or a reflection layer of the phosphor wheel. However, silicone has issues such as lack of high-temperature resistance and degradation, and therefore when the laser excites the phosphor wheel over a long period of time, the silicone cannot tolerate the high temperature such that degradation or burning readily occurs, thus affecting the luminous efficiency and reliability of the phosphor wheel. On the other hand, the manufacture of another phosphor wheel involves replacing the silicone by an inorganic bonding material (the main component thereof is, for instance, glass or metal oxide) to mixing with the phosphor or reflective material to form the wavelength conversion layer or reflection layer of the phosphor wheel. The phosphor wheel formed by this process has better thermal conductivity and heat resistance, but the material of such an inorganic bonding material is more brittle such that the phosphor wheel cracks more readily, and the phosphor wheel has worse adhesion with a thermally conductive substrate than silicone. Moreover, the inorganic bonding material generates more pores in the wavelength conversion layer after curing, thus affecting the conversion efficiency of the wavelength conversion layer.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a wavelength conversion module having good conversion efficiency and reliability.

The invention provides a projection device having good optical quality and reliability.

The invention provides a forming method of a wavelength conversion module that can form a wavelength conversion module having good conversion efficiency and reliability.

Other objects and advantages of the invention can be further understood from the technical features disclosed by the invention.

In order to achieve one or a portion of or all of the above objects or other objects, an embodiment of the invention provides a wavelength conversion module. The wavelength conversion module includes a substrate and a wavelength conversion layer. The substrate includes an axis, and the axis is located at the center of the substrate. The wavelength conversion layer is located on the substrate and includes two first wavelength conversion layers and a second wavelength conversion layer. Each of the first wavelength conversion layers includes a wavelength conversion material and a first bonding material, and the wavelength conversion material is dispersed in the first bonding material. The second wavelength conversion layer is located between the two first wavelength conversion layers in a radial direction from the axis of the substrate to an edge of the substrate, and the second wavelength conversion layer includes the wavelength conversion material and a second bonding material. The wavelength conversion material is dispersed in the second bonding material, and the first bonding material of the two first wavelength conversion layers is different from the second bonding material of the second wavelength conversion layer.

In order to achieve one or a portion of or all of the above objects or other objects, an embodiment of the invention provides a projection device. The projection device includes the aforementioned wavelength conversion module, an excitation light source, a light valve, and a projection lens. The excitation light source is adapted to emit an excitation beam, wherein the excitation beam is transmitted to the wavelength conversion module and forms an illumination beam through the wavelength conversion module. The light valve is located on the transmission path of the illumination beam and is adapted to convert the illumination beam into an image beam. The projection lens is located on the transmission path of the image beam and is adapted to convert the image beam into a projection beam.

In order to achieve one or a portion of or all of the above objects or other objects, an embodiment of the invention provides a forming method of a wavelength conversion module including the following steps. A substrate is provided, wherein the substrate includes an axis, and the axis is located at the center of the substrate. Two first wavelength conversion layers are formed on the substrate, wherein each of the first wavelength conversion layers includes a wavelength conversion material and a first bonding material, and the wavelength conversion material is dispersed in the first bonding material. A second wavelength conversion layer is formed on the substrate, wherein the second wavelength conversion layer is located between the two first wavelength conversion layers in a radial direction from the axis of the substrate to an edge of the substrate, and the second wavelength conversion layer includes the wavelength conversion material and a second bonding material. The wavelength conversion material is dispersed in the second bonding material, and the first bonding material of the two first wavelength conversion layers is different from the second bonding material of the second wavelength conversion layer.

Based on the above, the embodiments of the invention have at least one of the following advantages or efficacies. In an embodiment of the invention, the thermal conductivity, heat resistance, and reliability of the wavelength conversion module can be increased by the disposition of the second wavelength conversion layer and the material selection of the second bonding material thereof. Moreover, in the wavelength conversion module, the wavelength conversion layer can also maintain good conversion efficiency and good adhesion for the substrate through the disposition of the two first wavelength conversion layers and the material selection of the first bonding material thereof, and the reliability of the wavelength conversion module can also be increased as a result. Moreover, in an embodiment of the invention, the projection device can also have both good optical quality and reliability by disposing the region having high energy density of the laser spot on the second wavelength conversion layer having high thermal conductivity and heat resistance. Moreover, in the forming method of the wavelength conversion module of an embodiment of the invention, by forming the second wavelength conversion layer located between the two first wavelength conversion layers in the wavelength conversion module, the wavelength conversion module can have both good reliability and conversion efficiency.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The above and other technical content, features, and efficacies of the invention are clearly illustrated in the following via the detailed description of preferred embodiments of the reference figures. Directional terms mentioned in the embodiments below such as up, down, left, right, front, and back are only references to the directions in the figures. Thus, terms used to describe direction are descriptive and are not intended to limit the invention.

Figure 1:
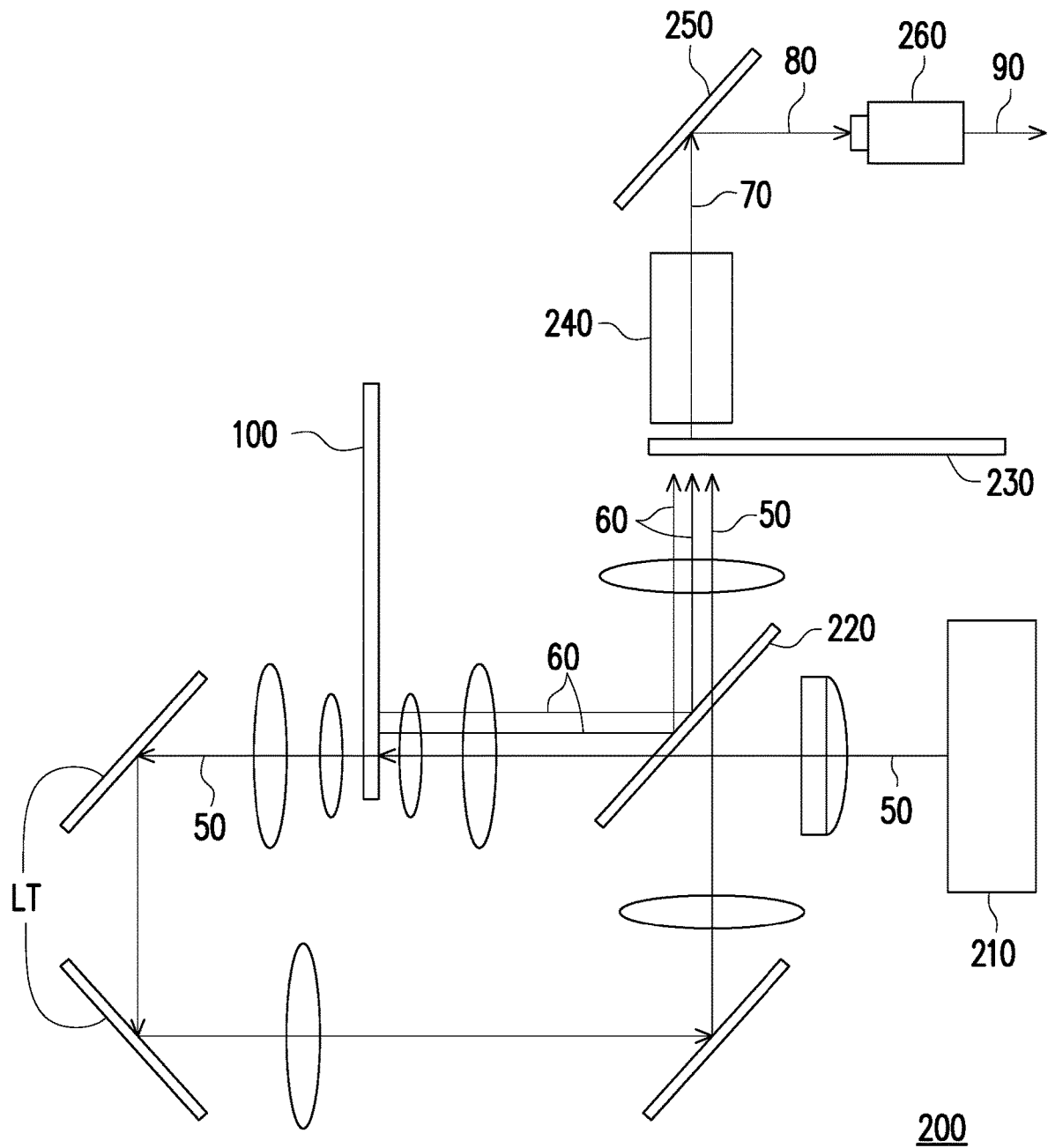
FIG. 1 is a configuration schematic of a projection device of an embodiment of the invention.
Figure 2A:
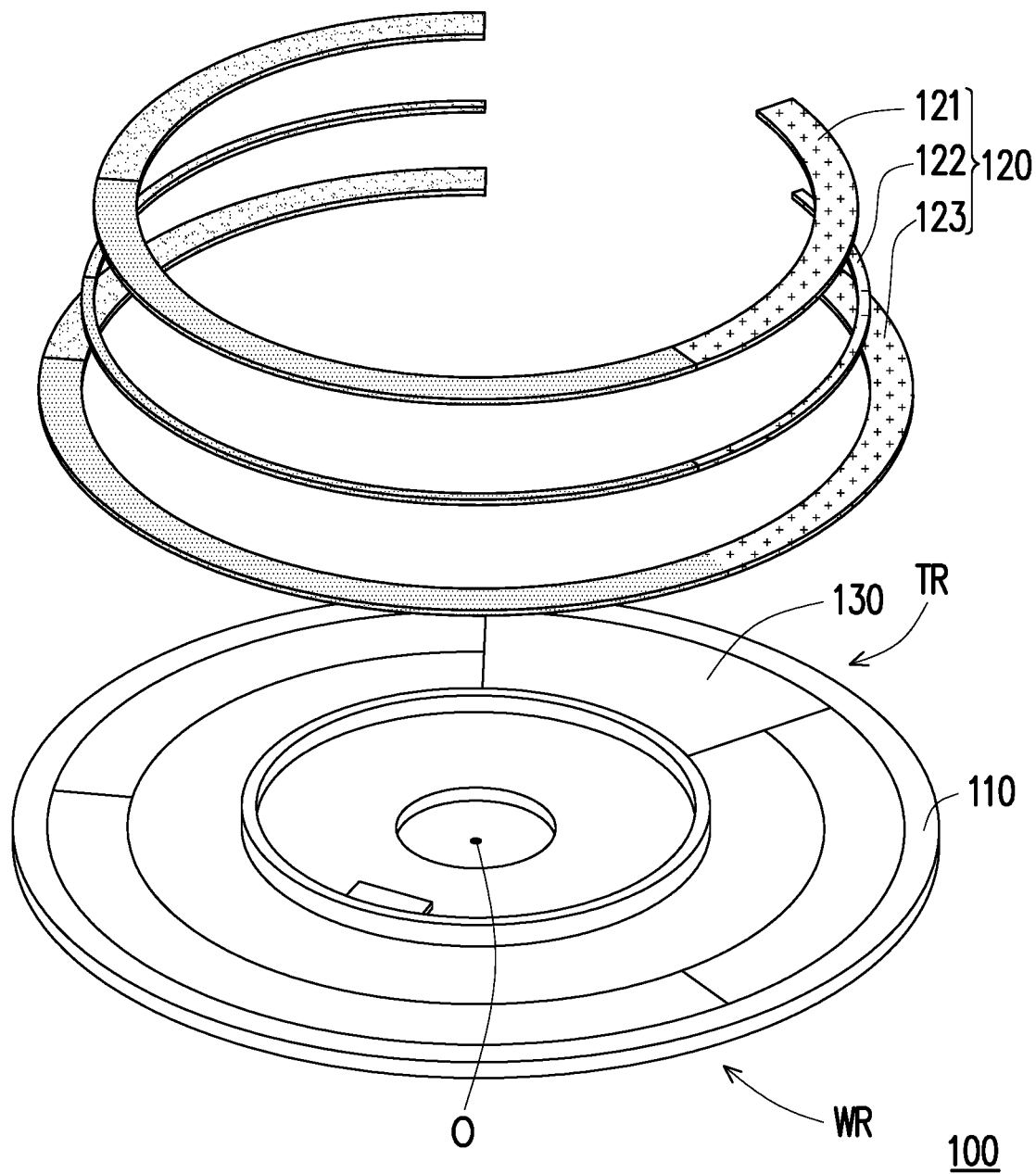
FIG. 2A is an exploded view of a wavelength conversion module of FIG. 1.
Figure 2B:
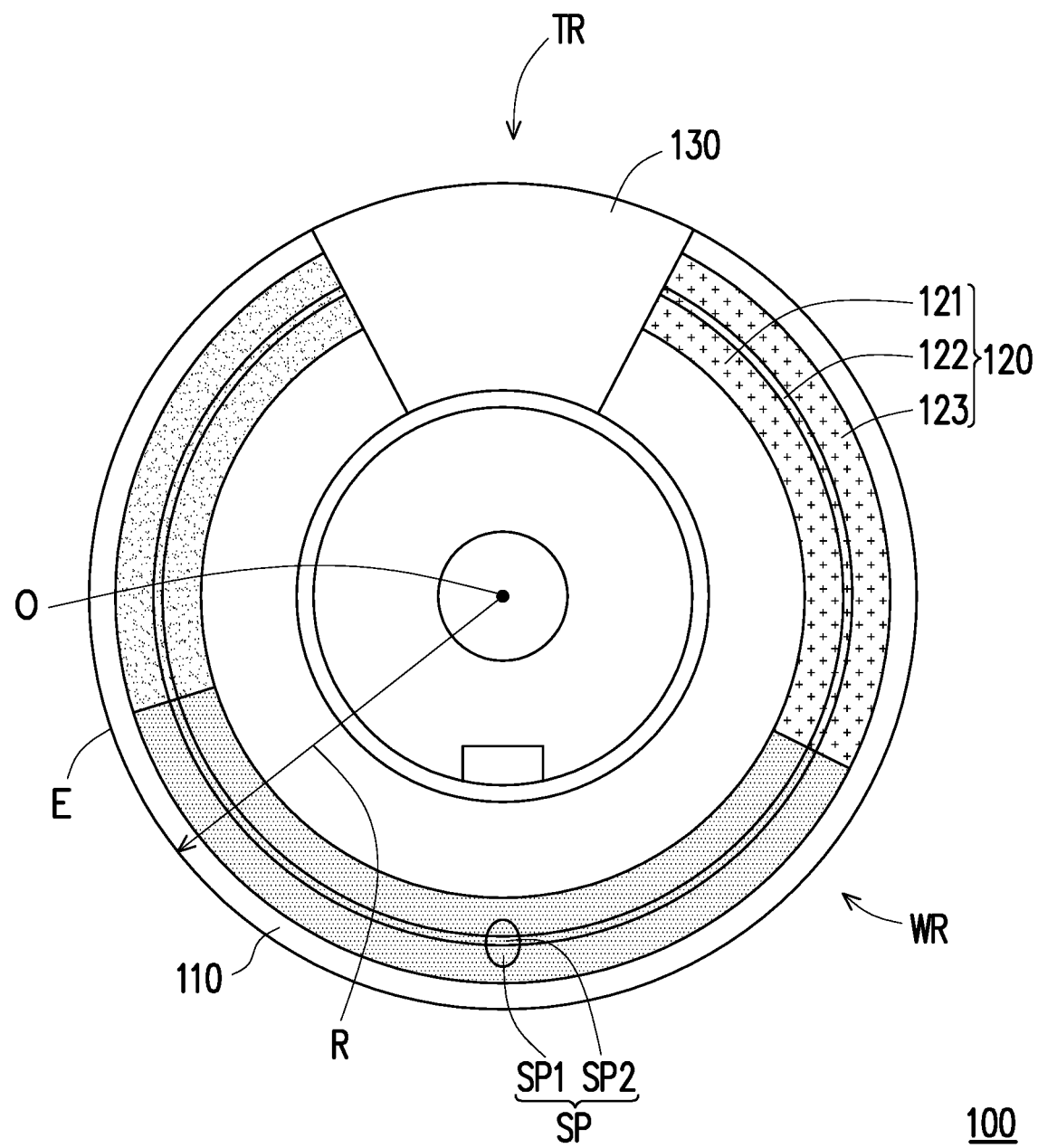
FIG. 2B is a top view of the wavelength conversion module of FIG. 2A.
Figure 2C:
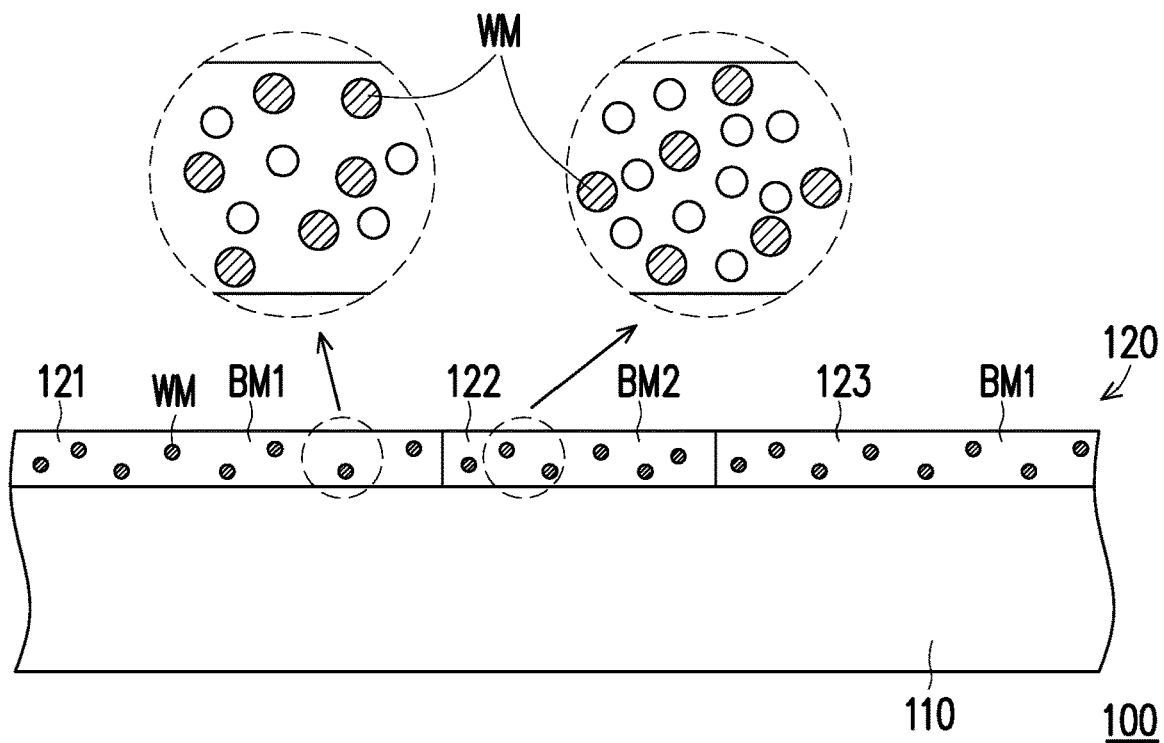
FIG. 2C is a cross-sectional view of the wavelength conversion module of FIG. 2A.
Figure 2D:
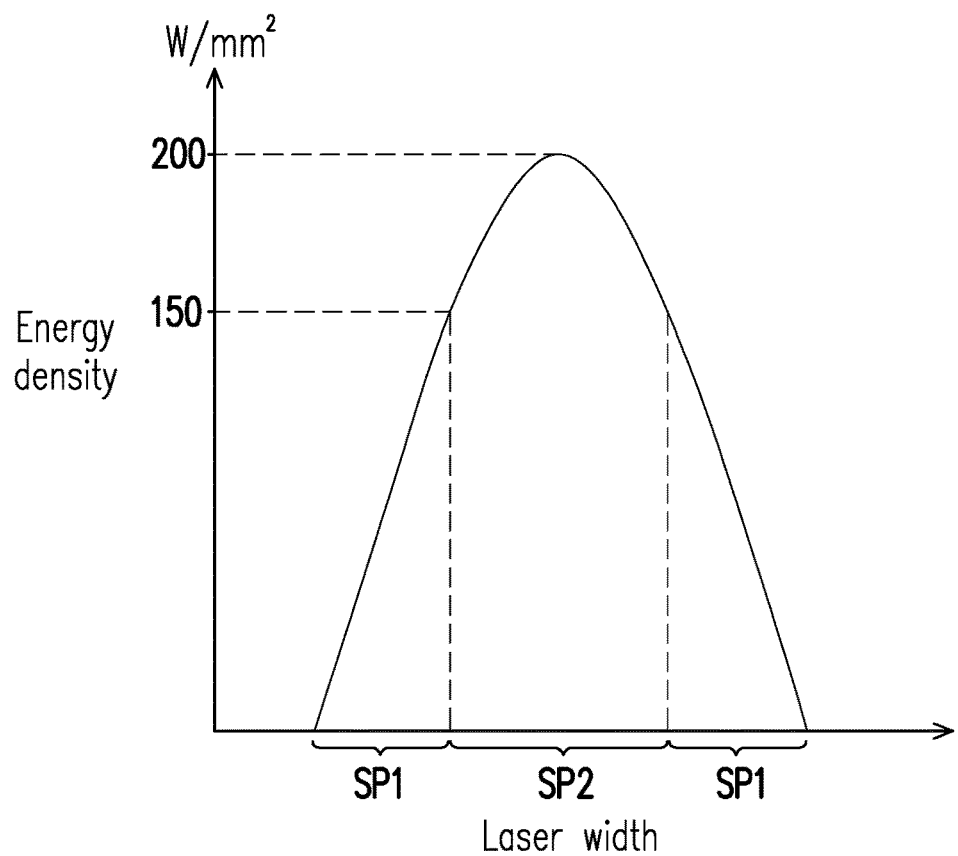
FIG. 2D shows the relationship between energy density and width of the laser spot of FIG. 2B.

FIG. 1 is a configuration schematic of a projection device of an embodiment of the invention. FIG. 2A is an exploded view of a wavelength conversion module of FIG. 1. FIG. 2B is a top view of the wavelength conversion module of FIG. 2A. FIG. 2C is a cross-sectional view of the wavelength conversion module of FIG. 2A. FIG. 2D shows the relationship between energy density and width of the laser spot of FIG. 2B. Referring to FIG. 1 to FIG. 2C, a projection device 200 includes an excitation light source 210, a splitting unit 220, a wavelength conversion module 100, a light valve 250, and a projection lens 260. For instance, in the embodiment, the light valve 250 is a digital micro-mirror device (DMD) or a liquid-crystal-on-silicon (LCOS) panel. However, in other embodiments, the light valve 250 can also be a transmissive liquid crystal panel or other beam modulators.

For instance, as shown in FIG. 1, in the embodiment, the excitation light source 210 is adapted to emit an excitation beam 50. In the embodiment, the excitation light source 210 is a laser light source, and the excitation beam 50 is a blue laser beam. For instance, the excitation light source 210 can include a plurality of blue laser diodes (not shown) arranged in an array, but the invention is not limited thereto.

Specifically, as shown in FIG. 1, in the embodiment, the splitting unit 220 is disposed on the transmission path of the excitation beam 50 and located between the excitation light source 210 and the wavelength conversion module 100. Specifically, the splitting unit 220 can be a partially-transmissive and partially-reflective element, a color separation element, a polarizing splitting element, or various other elements that can split a beam. Specifically, in the embodiment, the splitting unit 220 can, for instance, allow blue beam to pass through and provide a reflective effect for beams of other colors (such as red, green, or yellow). In other words, the splitting unit 220 can allow the blue excitation beam 50 to pass through, and as a result, the excitation beam 50 can pass through the splitting unit 220 and be incident to the wavelength conversion module 100.

As shown in FIG. 1, in the embodiment, the wavelength conversion module 100 is located on the transmission path of the excitation beam 50, and as shown in FIG. 2A to FIG. 2B, in the embodiment, the wavelength conversion module 100 includes at least one wavelength conversion region WR and a transmission region TR. For instance, as shown in FIG. 1 to FIG. 2B, the at least one wavelength conversion region WR of the wavelength conversion module 100 is adapted to convert the excitation beam 50 into at least one conversion beam 60, and the transmission region TR of the wavelength conversion module 100 is adapted to allow the excitation beam 50 to pass through and be transmitted to a subsequent optical element.

More specifically, as shown in FIG. 2A to FIG. 2C, the wavelength conversion module 100 includes a substrate 110 and a wavelength conversion layer 120. The substrate 110 includes an axis O, and the axis O is located at the center of the substrate 110. The wavelength conversion layer 120 is located on the substrate 110 and disposed corresponding to the at least one wavelength conversion region WR, and includes two first wavelength conversion layers 121 and 123 and a second wavelength conversion layer 122. Each of the first wavelength conversion layers 121 and 123 includes a wavelength conversion material WM and a first bonding material BM1, and the wavelength conversion material WM is dispersed in the first bonding material BM1. The second wavelength conversion layer 122 is located between the two first wavelength conversion layers 121 and 123 in a radial direction R from the axis O of the substrate 110 to an edge E of the substrate 110, and the second wavelength conversion layer 122 includes the wavelength conversion material WM and a second bonding material BM2. The wavelength conversion material WM is dispersed in the second bonding material BM2, and the first bonding material BM1 of the two first wavelength conversion layers 121 and 123 is different from the second bonding material BM2 of the second wavelength conversion layer 122.

For instance, in the embodiment, the wavelength conversion material WM can be a phosphor that can be excited to emit red light, a phosphor that can be excited to emit yellow light, or a phosphor that can be excited to emit green light, and the phosphor that can be excited to emit the desired color light can be correspondingly selected based on requirements of different wavelength conversion regions WR. Moreover, the first bonding material BM1 is an organic bonding material and the second bonding material BM2 is an inorganic bonding material. The material of the first bonding material BM1 can be silicone having good adhesion effect for the substrate 110. Moreover, the material of the second bonding material BM2 can include a material such as phosphate, silicate, sulfate, borate, or metal oxide, or a combination thereof to achieve good thermal conductivity. Therefore, the resulting second wavelength conversion layer 122 can have good thermal conductivity, heat resistance, and reliability, and can withstand greater laser energy.

However, as shown in FIG. 2C, during the process of forming the second wavelength conversion layer 122 by such a second bonding material BM2, more pores are formed in the second wavelength conversion layer 122 as a result, and therefore the porosity of the second wavelength conversion layer 122 is greater than the porosity of the two first wavelength conversion layers 121 and 123. For instance, if the porosity of a wavelength conversion layer is defined as the volume ratio of the pores in the wavelength conversion layer, then the porosity in the first wavelength conversion layers 121 and 123 is less than or equal to 1%, and the porosity in the second wavelength conversion layer 122 is about 10% to 15%. Since a greater porosity affects the conversion efficiency of the wavelength conversion layer 120, the width ratio of the second wavelength conversion layer 122 in the wavelength conversion layer 120 needs to be moderately adjusted such that the wavelength conversion layer 120 can maintain good conversion efficiency and good adhesion for the substrate 110 as thermal conductivity, heat resistance, and reliability are increased by the disposition of the second wavelength conversion layer 122. It should be mentioned that, the numerical range here is only exemplary and is not intended to limit the invention.

Specifically, as shown in FIG. 1 and FIG. 2B, in the embodiment, when the excitation beam 50 is transmitted to the wavelength conversion module 100, the excitation beam 50 forms a spot SP on the wavelength conversion module 100, two first portions SP1 of the spot SP are respectively located on the two first wavelength conversion layers 121 and 123, a second portion SP2 of the spot SP is located on the second wavelength conversion layer 122, and the energy density of the second portion SP2 of the spot SP is greater than the energy density of the two first portions SP1 of the spot SP. For instance, in the embodiment, the laser energy density that can be tolerated by the second wavelength conversion layer 122 is about 150 W/mm$^2$ to 200 W/mm$^2$, and the laser energy density that can be tolerated by the first wavelength conversion layers 121 and 123 is less than about 150 W/mm$^2$. In other words, as shown in FIG. 1 and FIG.

2D, in the embodiment, the region for which the energy density in the spot SP is between about 150 W/mm$^2$ and 200 W/mm$^2$ is the second portion SP2 of the spot SP, and the regions for which the energy density in the spot SP is less than about 150 W/mm$^2$ are the first portions SP1 of the spot SP.

More specifically, as shown in FIG. 1 and FIG. 2D, in the embodiment, when the highest point of the peak of the energy density of the spot SP is about 200 W/mm$^2$, in terms of ratio, the width of the first portions SP1 of the spot SP is about 75% the width of the spot SP and the width of the second portion SP2 of the spot SP is about 25% the width of the spot SP. Therefore, the width ratio of the first wavelength conversion layers 121 and 123 and the second wavelength conversion layer 122 can be designed based on the corresponding ratio such that the widths of the first wavelength conversion layer 121 and 123 still make up most of the width of the wavelength conversion layer 120. As a result, the wavelength conversion layer 120 can still maintain good conversion efficiency as thermal conductivity, heat resistance, and reliability are increased by the disposition of the second wavelength conversion layer 122. It should be mentioned that, the energy density of the laser spot is different with variations in, for instance, light source types or the configuration of other elements, and therefore the numerical ranges here are all only exemplary and are not intended to limit the invention.

As a result, the wavelength conversion module 100 can control the width ratio of the first wavelength conversion layers 121 and 123 and the second wavelength conversion layer 122 in the wavelength conversion layer 120 based on the energy density distribution of the incident spot SP, such that good conversion efficiency and good adhesion for the substrate 110 can still be maintained as the thermal conductivity, heat resistance, and reliability of the wavelength conversion module 100 are increased.

Moreover, as shown in FIG. 2A to FIG. 2B, in the embodiment, the wavelength conversion module 100 further includes a diffuser 130 disposed corresponding to the transmission region TR, and the substrate 110 of the wavelength conversion module 100 is a transparent material and does not have the structure of a reflection layer. In other words, in the embodiment, the wavelength conversion module 100 is a transmissive wavelength conversion module, and the transmission region TR is adapted to allow the excitation beam 50 to pass through.

Therefore, referring again to FIG. 1 and FIG. 2A to FIG. 2B, in the embodiment, the wavelength conversion module 100 further includes a first drive device (not shown) adapted to allow the transmission region TR and the at least one wavelength conversion region WR to enter the irradiation range of the excitation beam 50 at different times and selectively allow the excitation beam 50 to pass through or be converted into at least one conversion beam 60. As shown in FIG. 1, in the embodiment, when the transmission region TR of the wavelength conversion module 100 enters the irradiation region of the excitation beam 50, the excitation beam 50 passes through the wavelength conversion module 100, and then is transmitted onto a filter module 230 through an optical transmission module LT. Moreover, in the embodiment, when the at least one wavelength conversion region enters the irradiation range of the excitation beam 50, the excitation beam 50 is converted into the at least one conversion beam 60 by the at least one wavelength conversion region. Next, as shown in FIG. 1, the at least one conversion beam 60 from the wavelength conversion module 100 can be guided to the splitting unit 220 and be reflected onto the subsequent filter module 230.

Specifically, as shown in FIG. 1, the projection device 200 further includes the filter module 230, and the filter module 230 is located on the transmission path of the excitation beam 50 and the conversion beam 60 and has a filter region (not shown) and a translucent region (not shown). The filter module 230 further includes a second drive device (not shown) adapted to make filter regions (not shown) correspondingly enter the irradiation range of the conversion beam 60 at different times to respectively form a red light and a green light, for instance. Moreover, a translucent region (not shown) also correspondingly enters the irradiation range of the excitation beam 50 transmitted to the filter module 230 at a different time to form a blue light. As a result, the excitation beam 50 and the conversion beam 60 can form an illumination beam 70 having a plurality of different colors sequentially.

Moreover, as shown in FIG. 1, in the embodiment, the projection device 200 further includes a light-homogenizing element 240 located on the transmission path of the illumination beam 70. In the embodiment, the light-homogenizing element 240 includes an integration rod, but the invention is not limited thereto. More specifically, as shown in FIG. 1, when the illumination beam 70 is transmitted to the light-homogenizing element 240 through an illumination system, the light-homogenizing element 240 can homogenize the illumination beam 70 and transmit the illumination beam 70 to the light valve 250.

Next, as shown in FIG. 1, the light valve 250 is located on the transmission path of the illumination beam 70 and is adapted to convert the illumination beam 70 into an image beam 80. The projection lens 260 is located on the transmission path of the image beam 80 and is adapted to convert the image beam 80 into a projection beam 90 projected onto a screen (not shown) to form an image. Since the light valve 250 converts the illumination beam 70 into an image beam 80 of different colors to be transmitted to the projection lens 260 after the illumination beam 70 is converged on the light valve 250, the image formed by the projection beam 90 converted from the image beam 80 formed by the light valve 250 can form a color image.

As a result, the projection device 200 can have both good optical quality and reliability by disposing the region having high energy density in the laser spot SP on the second wavelength conversion layer 122 having high thermal conductivity and heat resistance in the wavelength conversion module 100.

Figure 3:
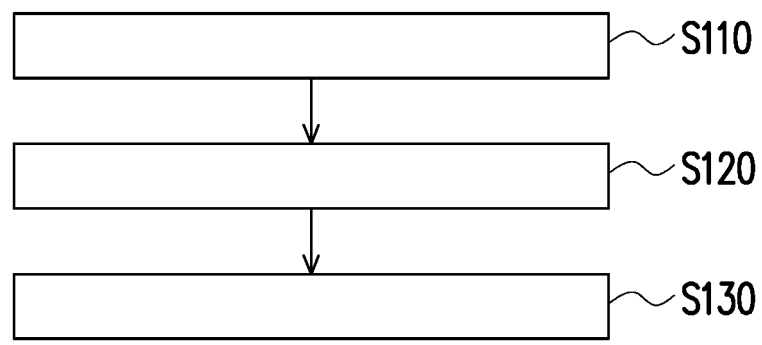
FIG. 3 is a flowchart of a forming method of a wavelength conversion module of an embodiment of the invention.
Figure 4A:
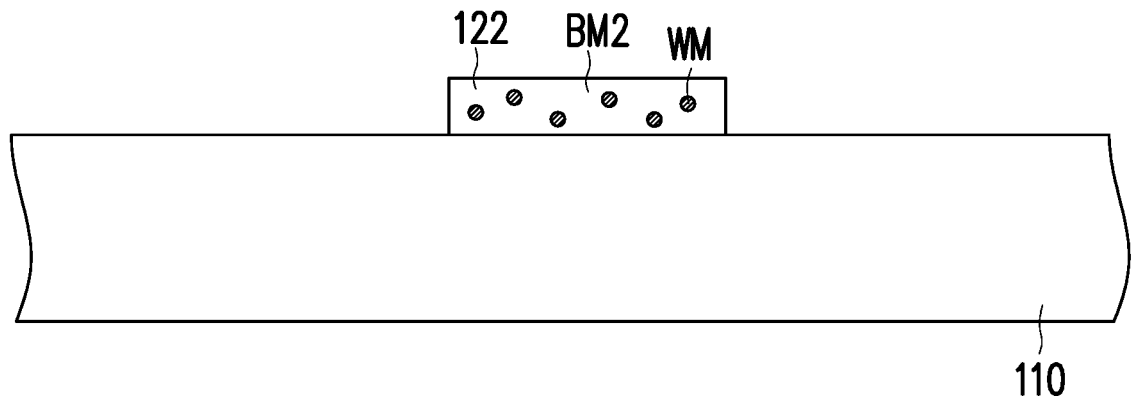
FIG. 4A to FIG. 4B are schematics of a manufacturing process of a wavelength conversion module of an embodiment of the invention.
Figure 4B:
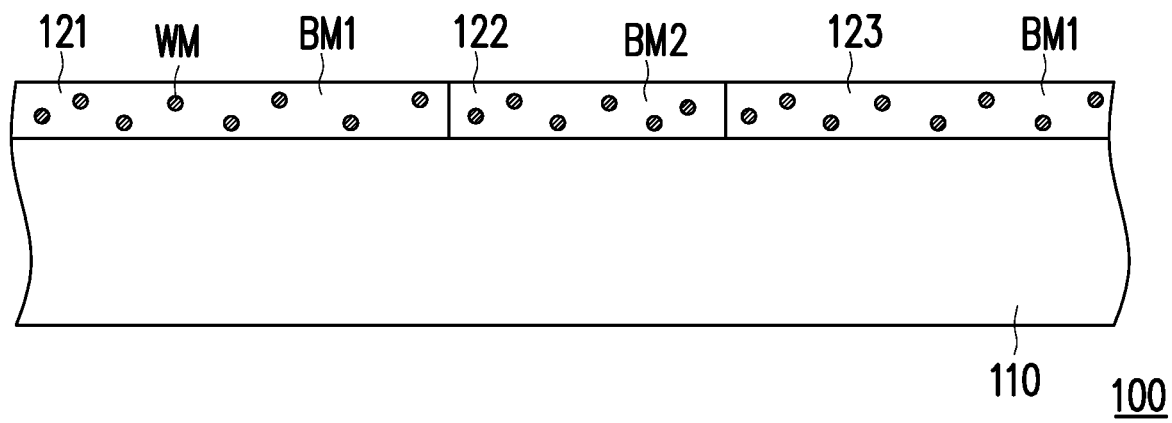

FIG. 3 is a flowchart of a forming method of a wavelength conversion module of an embodiment of the invention. FIG. 4A to FIG. 4B are schematics of a manufacturing process of a wavelength conversion module of an embodiment of the invention. Referring to FIG. 3, first, step S110 is executed to provide a substrate 110. Next, step S120 and step S130 are executed to form a second wavelength conversion layer 122 on the substrate 110 and form two first wavelength conversion layers 121 and 123 on the substrate 110.

For instance, as shown in FIG. 4A, step S120 is executed, and in the embodiment, the method of forming a second wavelength conversion layer 122 on the substrate 110 can include coating a wavelength conversion material WM and a second bonding material BM2 on the substrate 110. For instance, after the wavelength conversion material WM and the second bonding material BM2 are formed into a mixture, the mixture is coated on the substrate 110. Next, the wavelength conversion material WM and the second bonding material BM2 are cured.

On the hand, as shown in FIG. 4B, step S130 is executed, and in the embodiment, the method of forming the two first wavelength conversion layers 121 and 123 on the substrate 110 can involve coating the wavelength conversion material WM and a first bonding material BM1 on the substrate 110. For instance, after the wavelength conversion material WM and the first bonding material BM1 are formed into a mixture, the mixture is coated on the substrate 110. Next, the wavelength conversion material WM and the first bonding material BM1 are cured.

Specifically, in the embodiment, since the curing temperatures of the first bonding material BM1 and the second bonding material BM2 are both not greater than 300° C., the first bonding material BM1 and the second bonding material BM2 can be cured directly on the substrate 110. The structure of the wavelength conversion module 100 of FIG. 2A to FIG. 2C is thus formed.

Moreover, in the embodiment, although step S120 of FIG. 3 is executed first and then step S130 is executed as an example, i.e., two first wavelength conversion layers 121 and 123 are formed after the step of forming a second wavelength conversion layer 122 is executed, the invention is not limited thereto. In another embodiment, step S130 of FIG. 3 can also be executed first, and then step S120 is executed, i.e., a second wavelength conversion layer 122 is formed after the step of forming two first wavelength conversion layers 121 and 123 is executed. Those skilled in the art can adjust the order of the manufacturing process of the wavelength conversion module 100 based on product yield and actual requirement, and a similar wavelength conversion module 100 can also be formed, which is not repeated herein.

Figure 5A:
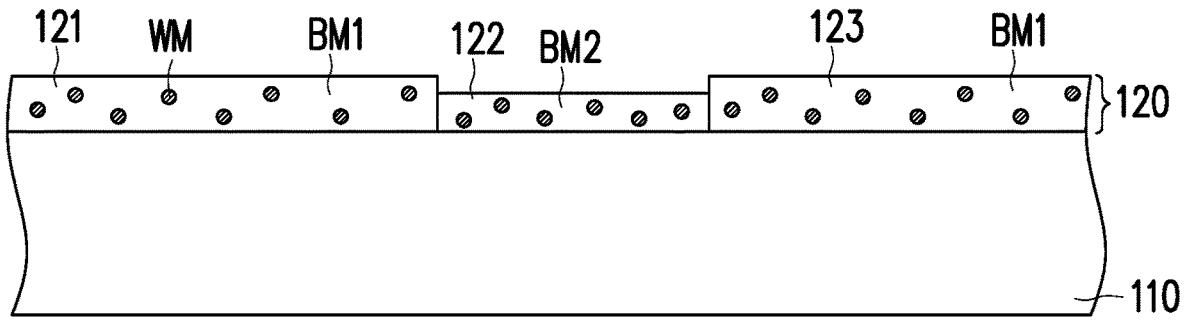
FIG. 5A to FIG. 5C are cross-sectional views of wavelength conversion modules of various embodiments of the invention.
Figure 5B:
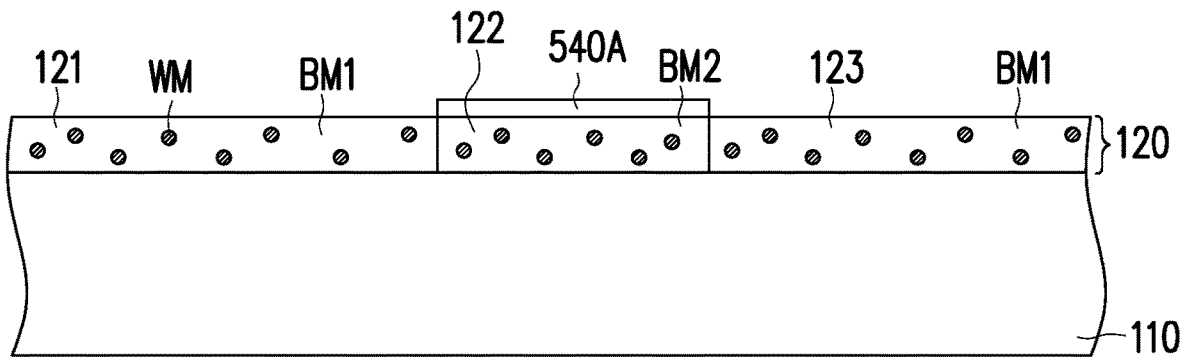
Figure 5C:
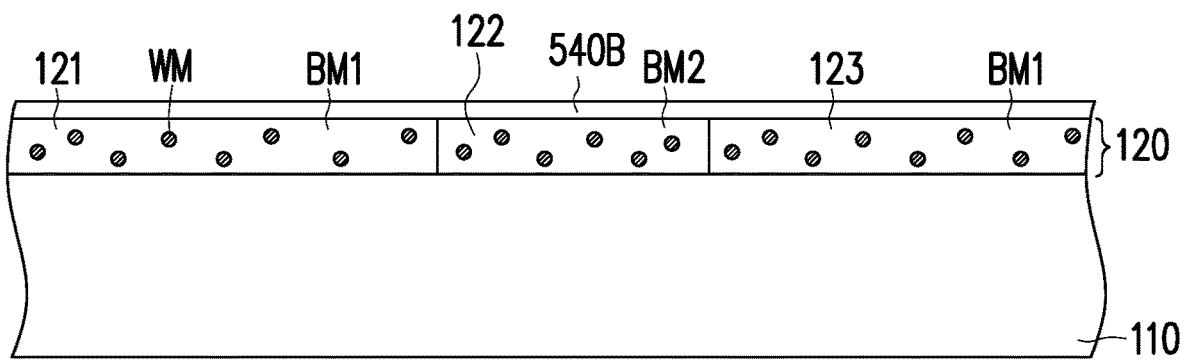

FIG. 5A to FIG. 5C are cross-sectional views of wavelength conversion modules of various embodiments of the invention. A wavelength conversion module 500A, a wavelength conversion module 500B, and a wavelength conversion module 500C of FIG. 5A to FIG. 5C are all similar to the wavelength conversion module 100 of FIG. 2C, and the wavelength conversion module 500A, the wavelength conversion module 500B, and the wavelength conversion module 500C can all be formed by the forming method of the wavelength conversion module of FIG. 3. The differences thereof with the wavelength conversion module 100 are described below.

In the embodiment of FIG. 5A, the thickness of the second wavelength conversion layer 122 of the wavelength conversion module 500A is less than the thickness of each of the first wavelength conversion layers 121 and 123 of the wavelength conversion module 500A. In the embodiment, since the energy of the spot SP formed by the excitation beam 50 is very high and heat is accumulated with the thickness of the wavelength conversion layer 120, the conversion efficiency of the wavelength conversion layer 120 is affected as a result. Therefore, in the embodiment, when step S120 in the forming method of the wavelength conversion module of FIG. 3 is executed, the thickness of the second wavelength conversion layer 122 can be moderately reduced to form the structure of the wavelength conversion module 500A of FIG. 5A. Therefore, the effect of the second portion SP2 of the spot SP having greater energy density on the conversion efficiency of the second wavelength conversion layer 122 can be reduced to further maintain the good conversion efficiency of the wavelength conversion module 500A.

In the embodiment of FIG. 5B, the wavelength conversion module 500B further includes an anti-reflection layer 540A located on the second wavelength conversion layer 122. For instance, in the embodiment, after step S120 in the forming method of the wavelength conversion module of FIG. 3 is executed, an anti-reflection layer 540A can be formed on the second wavelength conversion layer 122. In the embodiment, the anti-reflection layer 540A is, for instance, an AR coating coated on the second wavelength conversion layer 122. Therefore, the reflection ratio of an incident excitation beam 50 can be reduced such that excitation beams 50 incident at different angles can all enter the second wavelength conversion layer 122 efficiently to increase conversion efficiency.

In the embodiment of FIG. 5C, the wavelength conversion module 500C is similar to the wavelength conversion module 500B of FIG. 5B, and the differences therebetween are described below. The wavelength conversion module 500C also includes an anti-reflection layer 540B, but the anti-reflection layer 540B is located on the wavelength conversion layer 120. For instance, in the embodiment, after step S120 and step S130 in the forming method of the wavelength conversion module of FIG. 3 are executed, the anti-reflection layer 540B is comprehensively formed on the wavelength conversion layer 120. Therefore, excitation beams 50 incident at different angles can all enter the wavelength conversion layer 120 efficiently to increase conversion efficiency.

However, in the embodiment, since the first bonding material BM1 in the first wavelength conversion layers 121 and 123 is silicone which is soft, the anti-reflection layer 540B is less readily coated on the first bonding material BM1, thus affecting the reliability of the wavelength conversion module 500C. Therefore, those skilled in the art can select the manufacturing order and forming range of the anti-reflection layer in the forming method of the wavelength conversion module based on product yield and actual requirement to maintain both the conversion efficiency and reliability of the wavelength conversion module.

Figure 6:
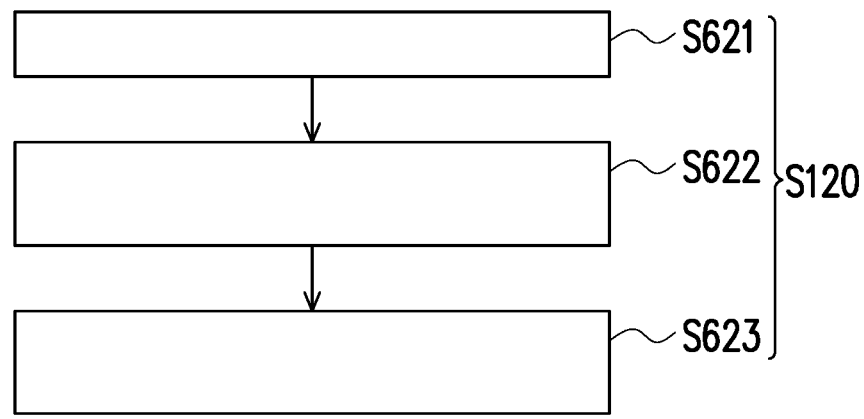
FIG. 6 is a flowchart of a second wavelength conversion layer processing step of an embodiment of the invention.
Figure 7A:
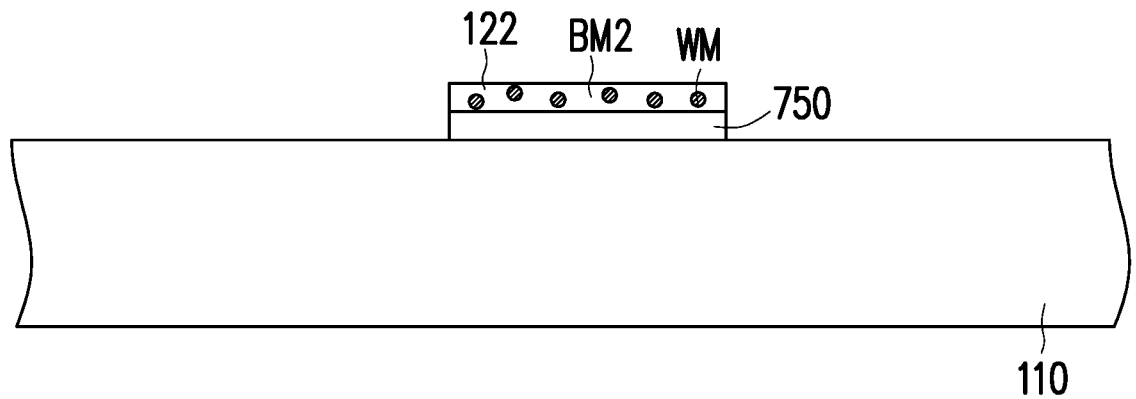
FIG. 7A to FIG. 7B are schematics of a manufacturing process of a wavelength conversion module of an embodiment of the invention.
Figure 7B:
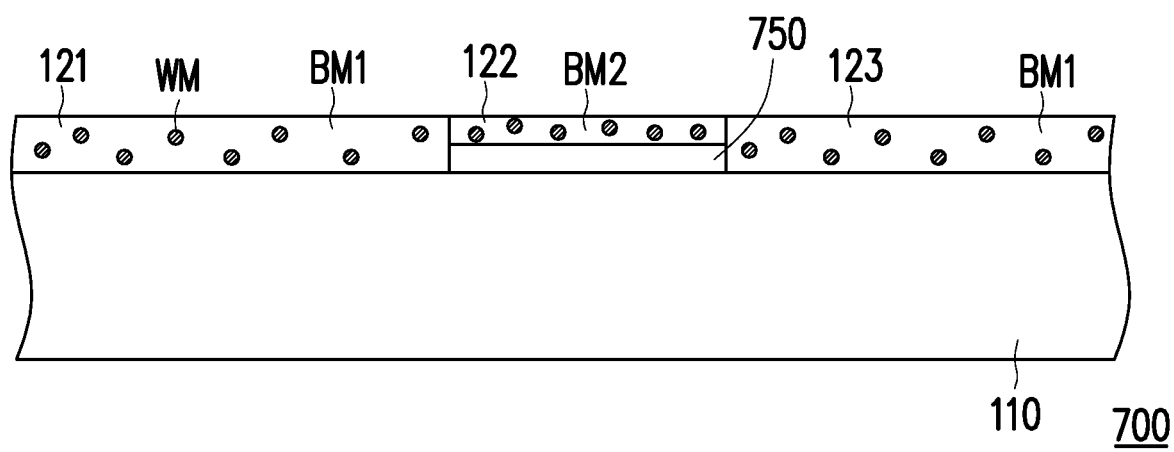

FIG. 6 is a flowchart of a second wavelength conversion layer processing step of an embodiment of the invention. FIG. 7A to FIG. 7B are schematics of a manufacturing process of a wavelength conversion module of an embodiment of the invention. The manufacturing process of a wavelength conversion module 700 of FIG. 7A and FIG. 7B is similar to the manufacturing process of the wavelength conversion module 100 of FIG. 4A and FIG. 4B, and the differences therebetween are described below. In the embodiment, the second bonding material BM2 can be an inorganic bonding material such as ceramic or silicon dioxide, and is formed by mixing the inorganic bonding material and the wavelength conversion material WM and then sintering the mixture. In other words, the second wavelength conversion layer 122 is formed by a phosphor-in-glass (PIG) process or a phosphor-in-ceramic (PIC) process. Therefore, when the wavelength conversion module 700 is manufactured by the forming method of the wavelength conversion module of FIG. 3, the curing temperature in step S120 is greater than 300° C., and therefore part of step S120 needs to be first executed outside the substrate 110, and then the second wavelength conversion layer 122 adheres to the substrate 110.

For instance, as shown in FIG. 6, in the embodiment, step S120 in the forming method of the wavelength conversion module of FIG. 3 can include steps S621, S622, and S623 below. First, step S621 is executed to provide a wavelength conversion material WM and a second bonding material BM2. Next, step S622 is executed to cure the wavelength conversion material WM and the second bonding material BM2 at a curing temperature, wherein the curing temperature is greater than 300° C. Next, step S623 is executed such that the second wavelength conversion layer 122 can adhere to the substrate 110 by an adhesive layer 750. For instance, in the embodiment, the adhesive layer 750 can be a thermally adhesive layer. The structure of the wavelength conversion module 700 of FIG. 7B is thus formed. As shown in FIG. 7B, in the embodiment, the wavelength conversion module 700 further includes an adhesive layer 750, wherein the adhesive layer 750 is located between the substrate 110 and the second wavelength conversion layer 122.

Therefore, in the embodiments above, since the wavelength conversion modules 500A, 500B, 500C, and 700 of FIG. 5A to FIG. 5C and FIG. 7B are similar to the wavelength conversion module 100 of FIG. 2C and can achieve the same function, the wavelength conversion modules 500A, 500B, 500C, and 700 can achieve similar effects and advantages as the wavelength conversion module 100 which are not repeated herein. Moreover, when the wavelength conversion modules 500A, 500B, 500C, and 700 are applied in the projection device 200, the projection device 200 can also achieve similar effects and advantages, which are not repeated herein.

Figure 8A:
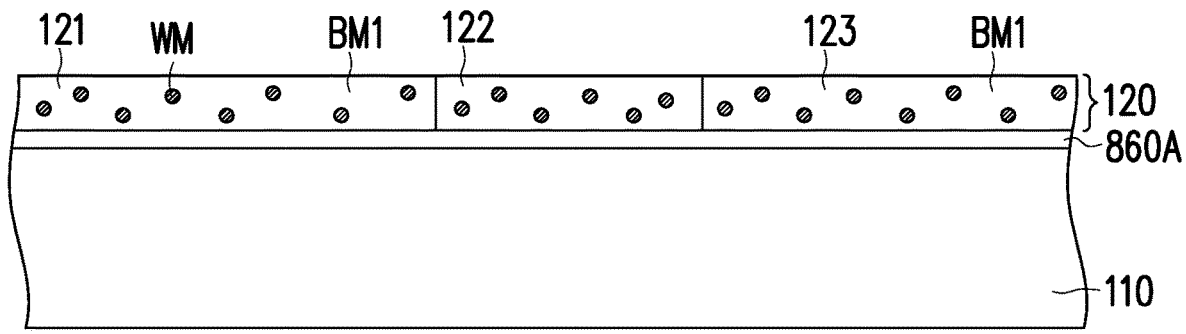
FIG. 8A to FIG. 8D are cross-sectional views of wavelength conversion modules of various embodiments of the invention.
Figure 8B:
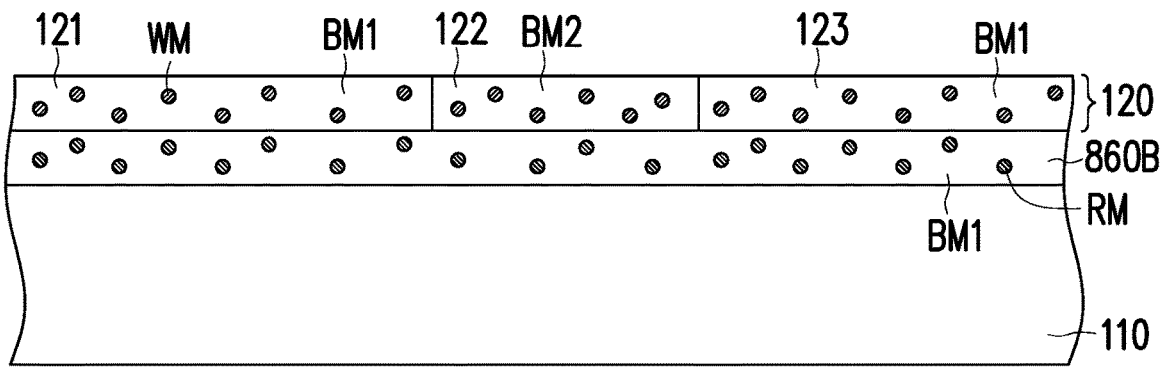
Figure 8C:
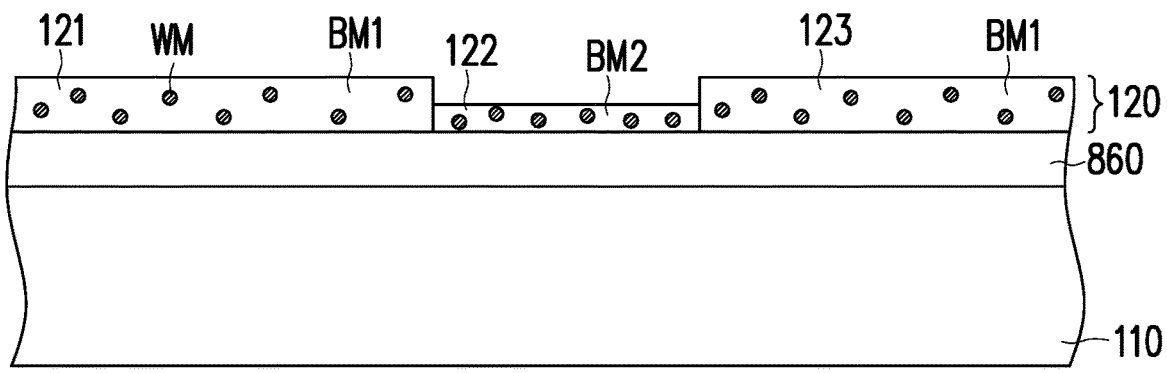
Figure 8D:
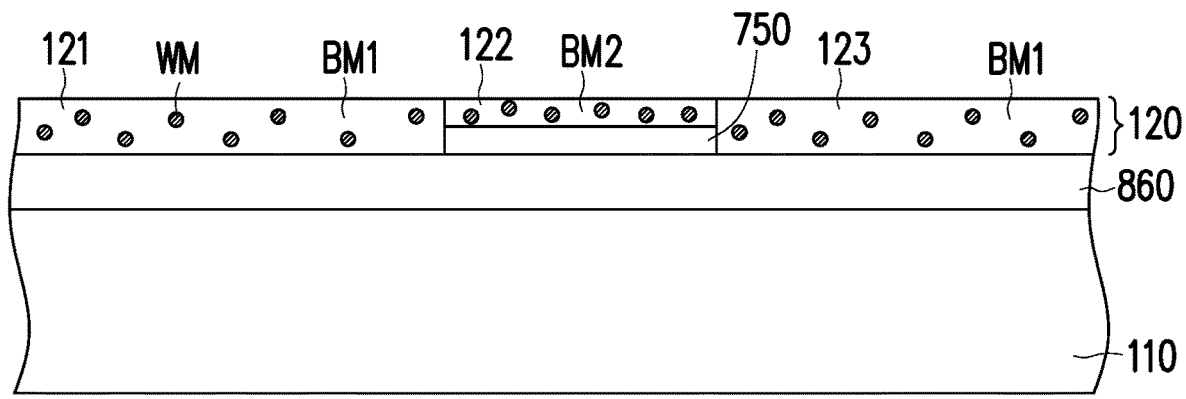

FIG. 8A to FIG. 8D are cross-sectional views of wavelength conversion modules of various embodiments of the invention. A wavelength conversion module 800A of FIG. 8A and a wavelength conversion module 800B of FIG. 8B are similar to the wavelength conversion module 100 of FIG. 2C, and a wavelength conversion module 800C of FIG. 8C and a wavelength conversion module 800D of FIG. 8D are respectively similar to the wavelength conversion module 500A of FIG. 5A and the wavelength conversion module 700 of FIG. 7B, and the differences are described below. Each of the wavelength conversion modules 800A, 800B, 800C, and 800D further includes a reflection layer on the substrate 110, wherein the reflection layer is located between the substrate 110 and the wavelength conversion layer 120. For instance, in the embodiment, the wavelength conversion modules 800A, 800B, 800C, and 800D of FIG. 8A to FIG. 8D can be manufactured by the forming method of the wavelength conversion module of FIG. 9. In the following, further description is provided with reference to FIG. 9.

Figure 9:
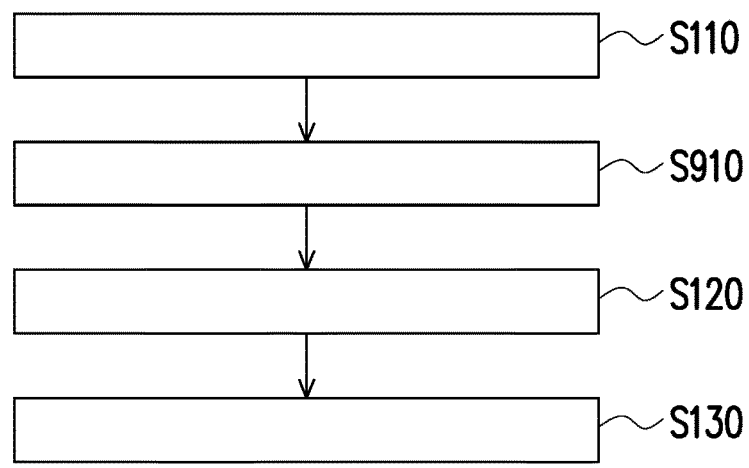
FIG. 9 is a flowchart of a forming method of a wavelength conversion module of an embodiment of the invention.

FIG. 9 is a flowchart of a forming method of a wavelength conversion module of an embodiment of the invention. The manufacturing process of the wavelength conversion module of FIG. 9 is similar to the manufacturing process of the wavelength conversion module of FIG. 3, and the differences therebetween are described below. In the embodiment, the two first wavelength conversion layers 121 and 123 and the second wavelength conversion layer 122 form a wavelength conversion layer 120, and before the step of forming the two first wavelength conversion layers 121 and 123 and the second wavelength conversion layer 122 is executed, step S910 is executed first to form a reflection layer on the substrate 110, wherein the reflection layer is located between the substrate 110 and the wavelength conversion layer 120.

For instance, as shown in FIG. 8A, in the embodiment, the reflection layer can be a high-reflection layer 860A, and can be a reflective coating or a mirror reflection layer. In the embodiment of FIG. 8A, the manufacturing method of the high-reflection layer 860A can involve coating a metal layer having a protective layer or a dielectric layer on the surface of the substrate 110. The material of the metal layer can be silver, silver alloy, aluminum, or aluminum alloy, or the manufacturing method of the high-reflection layer 860A can involve coating a dielectric on the surface of the substrate 110.

Alternatively, as shown in FIG. 8B, in the embodiment, the reflection layer can be a diffuse reflection layer 860B. The diffuse reflection layer 860B can be formed on the surface of the substrate 110 by mixing a scattering material RM with the first bonding material BM1, wherein the scattering material RM can be white scattering particles, and the material thereof can be titanium dioxide ($TiO_2$), silicon dioxide ($SiO_2$), aluminum oxide ($Al_2O_3$), boron nitride (BN), or zirconium dioxide ($ZrO_2$). Moreover, the diffuse reflection layer 860B can also be formed on the surface of the substrate 110 by mixing the scattering material RM with the second bonding material BM2, but the invention is not limited thereto.

The structures of the wavelength conversion module 800A of FIG. 8A and the wavelength conversion module 800B of FIG. 8B are thus formed. Moreover, referring to descriptions of related embodiments (such as the embodiment of FIG. 5A and the embodiment of FIG. 7A to FIG. 7B), the structures of the wavelength conversion module 800C of FIG. 8C and the wavelength conversion module 800D of FIG. 8D can also be formed, wherein the reflection layer of the wavelength conversion modules 800C and 800D is a reflection layer 860, and the reflection layer 860 can be a high reflection layer 860A or a diffuse reflection layer 860B. Related details are provided in the description of the embodiments above and are not repeated herein.

Figure 10A:
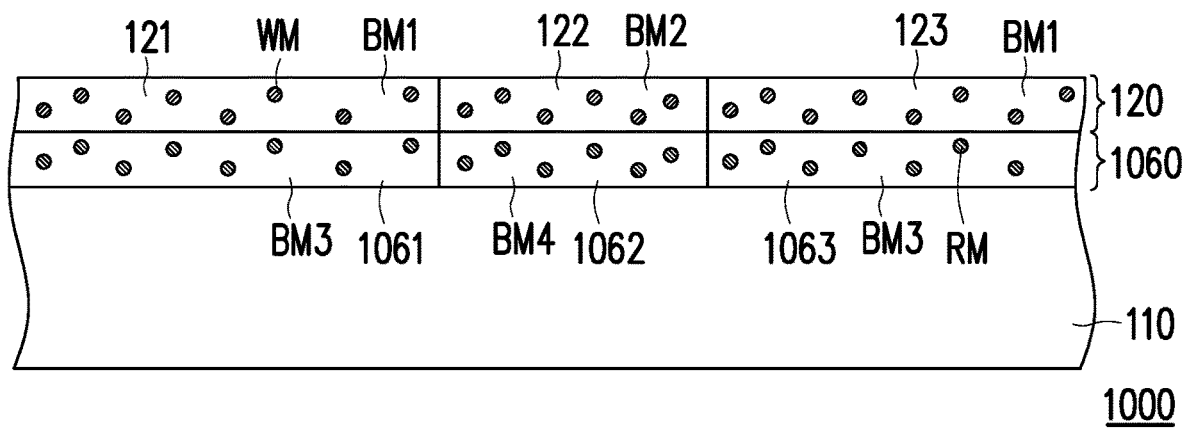
FIG. 10A is a cross-sectional view of another wavelength conversion module of an embodiment of the invention.
Figure 10B:
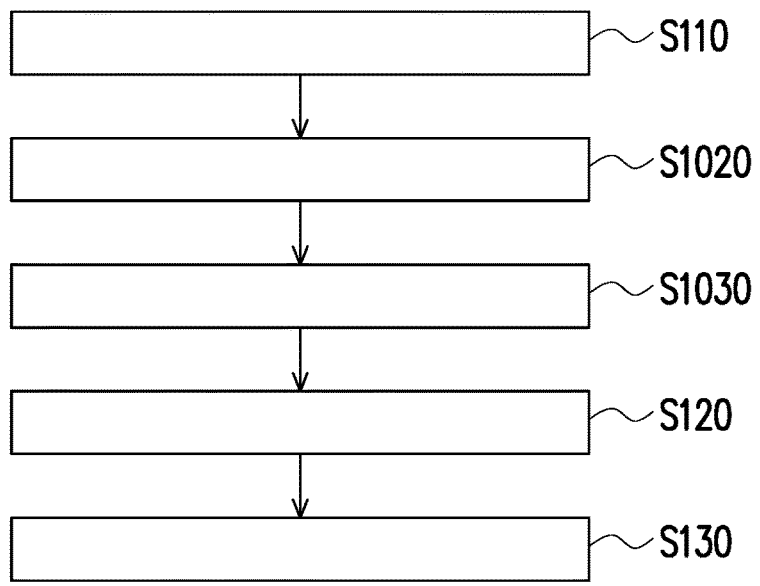
FIG. 10B is a flowchart of a forming method of another wavelength conversion module of an embodiment of the invention.

FIG. 10A is a cross-sectional view of another wavelength conversion module of an embodiment of the invention. FIG. 10B is a flowchart of a forming method of another wavelength conversion module of an embodiment of the invention. A wavelength conversion module 1000 of FIG. 10A is similar to the wavelength conversion module 800B of FIG. 8B, and the differences are described below. As shown in FIG. 10A, in the embodiment, the reflection layer is a diffuse reflection layer 1060, and the diffuse reflection layer 1060 can include two first reflection layers 1061 and 1063 and a second reflection layer 1062. The first reflection layers 1061 and 1063 are respectively located between the substrate 110 and the first wavelength conversion layers 121 and 123, and each of the first reflection layers 1061 and 1063 includes a scattering material RM and a third bonding material BM3, wherein the scattering material RM is dispersed in the third bonding material BM3. The second reflection layer 1062 is located between the substrate 110 and the second wavelength conversion layer 122, and the second reflection layer 1062 includes the scattering material RM and a fourth bonding material BM4, wherein the scattering material RM is dispersed in the fourth bonding material BM4, and the third bonding material BM3 is different from the fourth bonding material BM4.

For instance, in the embodiment, the third bonding material BM3 can be an organic bonding material which can be silicone, the same as the first bonding material BM1. Moreover, the fourth bonding material BM4 can be an inorganic bonding material which can include, for instance, phosphate, silicate, sulfate, borate, or metal oxide, or a combination thereof, and can be made the same as or different from the second bonding material BM2. However, the fourth bonding material BM4 and the second bonding material BM2 share the commonality of having good thermal conductivity and heat resistance.

For instance, in the embodiment, the wavelength conversion module 1000 of FIG. 10A can be manufactured by the forming method of the wavelength conversion module of FIG. 10B. For instance, referring to FIG. 10B, first, step S110 is executed to provide a substrate 110. Next, before step S120 and step S130 are executed, step S1020 and step S1030 are executed first, i.e., a second reflection layer 1062 is respectively first formed on the substrate 110 and two first reflection layers 1061 and 1063 are formed on the substrate 110. Next, step S120 and step S130 are executed to form a second wavelength conversion layer 122 and form two first wavelength conversion layers 121 and 123 on the substrate 110. The structure of the wavelength conversion module 1000 of FIG. 10A is thus formed.

Moreover, in the embodiment, although step S1020 is executed first and then step S1030 is executed as an example, i.e., two first reflection layers 1061 and 1063 are formed after the step of forming a second reflection layer 1062 is executed, the invention is not limited thereto. In another embodiment, step S1030 of FIG. 10B can also be executed first, and then step S1020 is executed, i.e., a second reflection layer 1062 is formed after the step of forming two first reflection layers 1061 and 1063 is executed. Those skilled in the art can adjust the order of the manufacturing process of the wavelength conversion module 1000 based on product yield and actual requirement, and a similar wavelength conversion module 1000 can also be formed, which is not repeated herein.

Figure 11A:
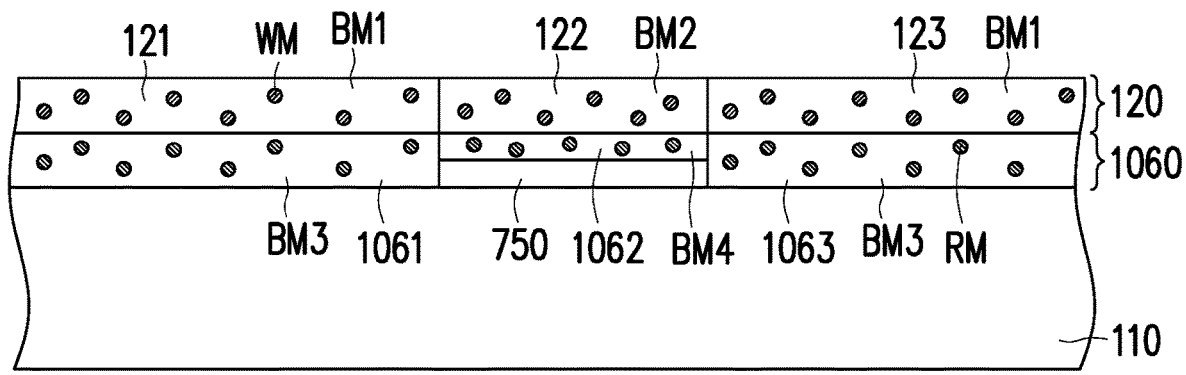
FIG. 11A is a cross-sectional view of another wavelength conversion module of an embodiment of the invention.
Figure 11B:
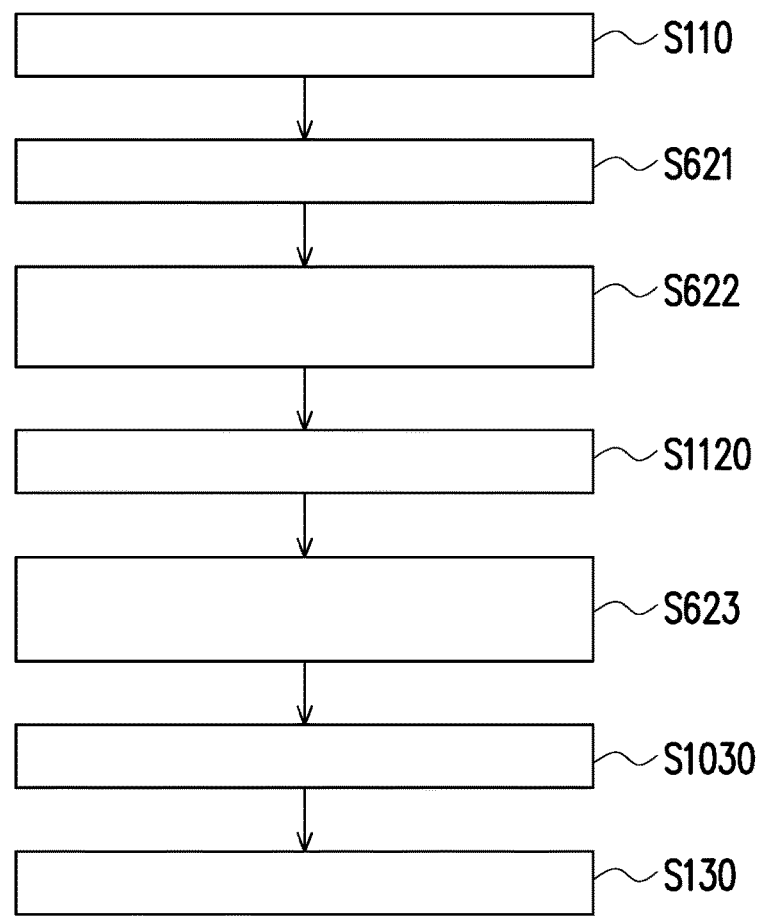
FIG. 11B is a flowchart of a forming method of another wavelength conversion module of an embodiment of the invention.

FIG. 11A is a cross-sectional view of another wavelength conversion module of an embodiment of the invention. FIG. 11B is a flowchart of a forming method of another wavelength conversion module of an embodiment of the invention. The wavelength conversion module 1100 of FIG. 11A is similar to the wavelength conversion module 1000 of FIG. 10A, and the differences are described below. As shown in FIG. 10A, in the embodiment, the second bonding material BM2 of the second wavelength conversion layer 122 can be an inorganic bonding material such as ceramic or silicon dioxide, and is formed by mixing the inorganic bonding material and the wavelength conversion material WM and then sintering the mixture. In other words, in the embodiment, the method of step S120 of forming the second wavelength conversion layer 122 is similar to the method of the embodiment of FIG. 7A to FIG. 7B in that the second wavelength conversion layer 122 is formed by curing the wavelength conversion material WM and the second bonding material BM2 at a curing temperature greater than 300° C. The related details can refer to the description of the above embodiments and are not repeated herein. Next, step S1120 is executed to form a second reflection layer 1062 on the second wavelength conversion layer 122. Next, step S623 is executed such that the second reflection layer 1062 and the second wavelength conversion layer 122 can adhere to the substrate 110 by the adhesive layer 750. The structure of the wavelength conversion module 1100 of FIG. 11A is thus formed.

It should be mentioned that, although in both the wavelength conversion module 800D of FIG. 8D and the wavelength conversion module 1100 of FIG. 11A, the second wavelength conversion layer 122 is formed by curing the wavelength conversion material WM and the second bonding material BM2 at a curing temperature greater than 300° C., due to the different manufacturing order of forming the diffuse reflection layer 1060, the location of the adhesive layer 750 is also different, and selection of relevant materials needs to be performed based on requirement. For instance, in the embodiment of FIG. 8D, the adhesive layer 750 is located between the second wavelength conversion layer 122 and the reflection layer 860, and in the embodiment of FIG. 11A, the second reflection layer 1062 is located between the second wavelength conversion layer 122 and the adhesive layer 750. Therefore, in the embodiment of FIG. 8D, the material of the adhesive layer 750 needs to be transparent, otherwise light cannot enter the reflection layer 860, and in the embodiment of FIG. 11A, the material of the adhesive layer 750 is not particularly limited.

In the embodiments above, since the wavelength conversion modules 800A, 800B, 800C, 800D, 1000, and 1100 of FIG. 8A to FIG. 8D, FIG. 10A, and FIG. 11A have similar structures to the wavelength conversion layer 120 of the wavelength conversion module 100 of FIG. 2C and can achieve the same function, the wavelength conversion modules 800A, 800B, 800C, 800D, 1000, and 1100 can achieve similar effects and advantages to the wavelength conversion module 100 which are not repeated herein.

Moreover, the wavelength conversion modules 800A, 800B, 800C, 800D, 1000, and 1100 of FIG. 8A to FIG. 8D, FIG. 10A, and FIG. 11A can also be described with reference to the embodiment of FIG. 5B to FIG. 5C, the anti-reflection layer 540A or the anti-reflection layer 540B is optionally formed in the wavelength conversion modules 800A, 800B, 800C, 800D, 1000, and 1100, and a structure similar to the wavelength conversion module of FIG. 5B and FIG. 5C can be formed. Related details can refer to the description of the embodiments above and are not repeated herein.

Moreover, in the embodiment of FIG. 1, although the projection device 200 includes the wavelength conversion module 100 as an example, the invention is not limited thereto. In other embodiments, the wavelength conversion modules 500A, 500B, 500C, 700, 800A, 800B, 800C, 800D, 1000, and 1100 can also be applied in the projection device 200, and any person having ordinary skill in the art can suitably modify the optical path thereof after referencing the invention such that the projection device achieves similar effects and advantages to the projection device 200, which is still within the scope of the invention. In the following, some embodiments are provided for description.

Figure 12:
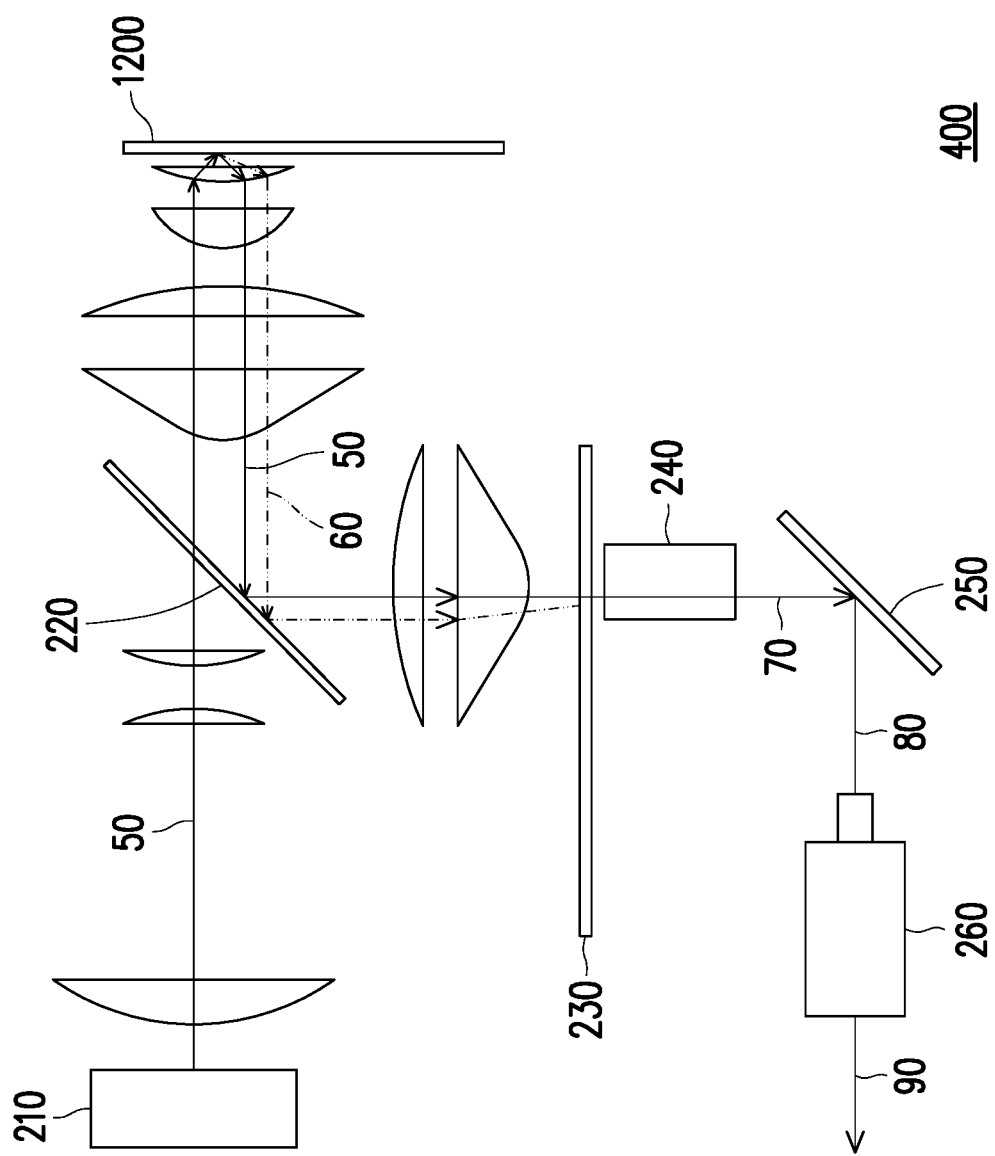
FIG. 12 is a configuration schematic of another projection device of an embodiment of the invention.

FIG. 12 is a configuration schematic of another projection device of an embodiment of the invention. Referring to FIG. 12, a projection device 400 of the embodiment is similar to the projection device 200 of FIG. 1, and the differences between the two are described below. In the embodiment, the projection device 400 adopts a wavelength conversion module 1200, the wavelength conversion module 1200 is a reflective wavelength conversion module, and the wavelength conversion module 1200 is similar to the wavelength conversion modules 100, 500A, 500B, 500C, 700, 800A, 800B, 800C, 800D, 1000, and 1100, and the difference is only in that, since the wavelength conversion module 1200 is adapted to reflect the excitation beam 50, the wavelength conversion module 1200 does not have the transmission region TR, and a reflective region (not shown) is disposed at the location corresponding to the transmission region TR to reflect the excitation beam 50.

Specifically, as shown in FIG. 12, in the embodiment, when the reflective region of the wavelength conversion module 1200 enters the irradiation range of the excitation beam 50, the excitation beam 50 is reflected by the reflective region of the wavelength conversion module 1200, and then the excitation beam 50 from the wavelength conversion module 1200 can be guided to the splitting unit 220 and be reflected onto the subsequent filter module 230. Moreover, in the embodiment, when the at least one wavelength conversion region enters the irradiation range of the excitation beam 50, the excitation beam 50 is converted into the at least one conversion beam 60 by the at least one wavelength conversion region. Next, as shown in FIG. 12, the at least one conversion beam 60 from the wavelength conversion module 1200 can be guided to the splitting unit 220 and be reflected onto the subsequent filter module 230. Next, filter regions (not shown) of the filter module 230 correspondingly enter the irradiation range of the conversion beam 60 at different times to respectively form, for instance, a red light and a green light. Moreover, a translucent region (not shown) of the filter module 230 also correspondingly enters the irradiation range of the excitation beam 50 transmitted to the filter module 230 at a different time to form a blue light, and the subsequent illumination beam 70 and image beam 80 are formed as a result.

As a result, the projection device 200 and the projection device 400 can have both good optical quality and reliability by adopting the wavelength conversion modules 100, 500A, 500B, 500C, 700, 800A, 800B, 800C, 800D, 1000, 1100, and 1200 having good reliability and conversion efficiency and also by disposing the region having high energy density in the laser spot SP on the second wavelength conversion layer 122 having high thermal conductivity and heat resistance in the wavelength conversion modules 100, 500A, 500B, 500C, 700, 800A, 800B, 800C, 800D, 1000, 1100, and 1200.

Based on the above, the embodiments of the invention have at least one of the following advantages or efficacies. In an embodiment of the invention, the thermal conductivity, heat resistance, and reliability of the wavelength conversion module can be increased by the disposition of the second wavelength conversion layer and the material selection of the second bonding material thereof. Moreover, in the wavelength conversion module, the wavelength conversion layer can also maintain good conversion efficiency and good adhesion for the substrate through the disposition of the two first wavelength conversion layers and the material selection of the first bonding material thereof, and the reliability of the wavelength conversion module can also be increased as a result. Moreover, in an embodiment of the invention, the projection device can also have both good optical quality and reliability by disposing the region having high energy density of the laser spot on the second wavelength conversion layer having high thermal conductivity and heat resistance. Moreover, in the forming method of the wavelength conversion module of an embodiment of the invention, by forming the second wavelength conversion layer located between the two first wavelength conversion layers in the wavelength conversion module, the wavelength conversion module can have both good reliability and conversion efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A wavelength conversion module comprising a substrate and a wavelength conversion layer, wherein:
   the substrate comprises an axis, and the axis is located at a center of the substrate; and
   the wavelength conversion layer is located on the substrate, and the wavelength conversion comprises:
      two first wavelength conversion layers, wherein each of the first wavelength conversion layers comprises a wavelength conversion material and a first bonding material, and the wavelength conversion material is dispersed in the first bonding material; and
      a second wavelength conversion layer, wherein the second wavelength conversion layer is located between the two first wavelength conversion layers in a radial direction from the axis of the substrate to an edge of the substrate, the second wavelength conversion layer comprises the wavelength conversion material and a second bonding material, the wavelength conversion material is dispersed in the second bonding material, and the first bonding material of the two first wavelength conversion layers is different from the second bonding material of the second wavelength conversion layer.

2. The wavelength conversion module of claim 1, wherein the first bonding material is an organic bonding material, and the second bonding material is an inorganic bonding material.

3. The wavelength conversion module of claim 2, wherein the second bonding material comprises phosphate, silicate, sulfate, borate, metal oxide, or a combination thereof.

4. The wavelength conversion module of claim 2, wherein a thickness of the second wavelength conversion layer is less than a thickness of each of the first wavelength conversion layers.

5. The wavelength conversion module of claim 2, wherein the wavelength conversion module further comprises an anti-reflection layer located on the second wavelength conversion layer.

6. The wavelength conversion module of claim 2, further comprising an adhesive layer, wherein the adhesive layer is located between the substrate and the second wavelength conversion layer.

7. The wavelength conversion module of claim 1, further comprising an anti-reflection layer located on the wavelength conversion layer.

8. The wavelength conversion module of claim 1, further comprising a reflection layer located between the substrate and the wavelength conversion layer, and the reflection layer is a diffuse reflection layer or a high-reflection layer.

9. The wavelength conversion module of claim 8, wherein when the reflection layer is a diffuse reflection layer, the reflection layer comprises:
two first reflection layers, wherein each of the first reflection layers is respectively located between the substrate and each of the first wavelength conversion layers, each of the first reflection layers comprises a scattering material and a third bonding material, and the scattering material is dispersed in the third bonding material; and
a second reflection layer located between the substrate and the second wavelength conversion layer, and the second reflection layer comprises the scattering material and a fourth bonding material, wherein the scattering material is dispersed in the fourth bonding material, and the third bonding material is different from the fourth bonding material.

10. The wavelength conversion module of claim 9, wherein the third bonding material is an organic bonding material, and the fourth bonding material is an inorganic bonding material.

11. A forming method of a wavelength conversion module, comprising:
providing a substrate, wherein the substrate comprises an axis, and the axis is located at a center of the substrate;
forming two first wavelength conversion layers on the substrate, wherein each of the first wavelength conversion layers comprises a wavelength conversion material and a first bonding material, and the wavelength conversion material is dispersed in the first bonding material; and
forming a second wavelength conversion layer on the substrate, wherein the second wavelength conversion layer is located between the two first wavelength conversion layers in a radial direction from the axis of the substrate to an edge of the substrate, the second wavelength conversion layer comprises the wavelength conversion material and a second bonding material, the wavelength conversion material is dispersed in the second bonding material, and the first bonding material of the two first wavelength conversion layers is different from the second bonding material of the second wavelength conversion layer.

12. The forming method of the wavelength conversion module of claim 11, wherein a method of forming the two first wavelength conversion layers comprises:
coating the wavelength conversion material and the first bonding material on the substrate; and
curing the wavelength conversion material and the first bonding material.

13. The forming method of the wavelength conversion module of claim 11, wherein a method of forming the second wavelength conversion layer comprises:
coating the wavelength conversion material and the second bonding material on the substrate; and
curing the wavelength conversion material and the second bonding material.

14. The forming method of the wavelength conversion module of claim 11, wherein a method of forming the second wavelength conversion layer comprises:
curing the wavelength conversion material and the second bonding material at a curing temperature, wherein the curing temperature is greater than 300° C.; and
adhering the second wavelength conversion layer on the substrate by an adhesive layer.

15. The forming method of the wavelength conversion module of claim 11, wherein the two first wavelength conversion layers and the second wavelength conversion layer form a wavelength conversion layer, and forming a reflection layer on the substrate before the step of forming the two first wavelength conversion layers and the second wavelength conversion layer is executed, wherein the reflection layer is located between the substrate and the wavelength conversion layer.

16. A projection device, comprising a wavelength conversion module, an excitation light source, a light valve, and a projection lens, wherein:
the wavelength conversion module comprises a substrate and a wavelength conversion layer, wherein:
the substrate comprises an axis, and the axis is located at a center of the substrate; and
the wavelength conversion layer is located on the substrate and comprises:
two first wavelength conversion layers, wherein the two first wavelength conversion layers comprise a wavelength conversion material and a first bonding material, and the wavelength conversion material is dispersed in the first bonding material; and
a second wavelength conversion layer, wherein the second wavelength conversion layer is located between the two first wavelength conversion layers in a radial direction from the axis of the substrate to an edge of the substrate, the second wavelength conversion layer comprises the wavelength conversion material and a second bonding material, the wavelength conversion material is dispersed in the second bonding material, and the first bonding material of the two first wavelength conversion layers is different from the second bonding material of the second wavelength conversion layer;
the excitation light source is adapted to emit an excitation beam, wherein the excitation beam is transmitted to the wavelength conversion module and forms an illumination beam through the wavelength conversion module;
the light valve is located on a transmission path of the illumination beam and is adapted to convert the illumination beam into an image beam; and
the projection lens is located on a transmission path of the image beam and is adapted to convert the image beam into a projection beam.

17. The projection device of claim 16, wherein the first bonding material is an organic bonding material, and the second bonding material is an inorganic bonding material.

18. The projection device of claim 17, wherein when the excitation beam is transmitted to the wavelength conversion module, the excitation beam forms a spot on the wavelength conversion module, two first portions of the spot are respectively located on the two first wavelength conversion layers, a second portion of the spot is located on the second wavelength conversion layer, and an energy density of the second portion of the spot is greater than an energy density of the two first portions of the spot.

19. The wavelength conversion module of claim 17, wherein a thickness of the second wavelength conversion layer is less than a thickness of each of the first wavelength conversion layers.

20. The projection device of claim 16, wherein the wavelength conversion module further comprises a reflection layer located between the substrate and the wavelength conversion layer.

* * * * *